M. VAN M. BROWN.
FOOT SCRAPER FOR VEHICLES.
APPLICATION FILED MAR. 11, 1912.

1,146,399.

Patented July 13, 1915.

WITNESSES
W. H. Brereton
Frank G. Brereton

INVENTOR
Maud Van Meter Brown
by R. H. Muss, Attorney

UNITED STATES PATENT OFFICE.

MAUD VAN METER BROWN, OF CROWTHER, TEXAS.

FOOT-SCRAPER FOR VEHICLES.

1,146,399.   Specification of Letters Patent.   Patented July 13, 1915.

Application filed March 11, 1912.   Serial No. 683,026.

*To all whom it may concern:*

Be it known that I, MAUD VAN METER BROWN, a citizen of the United States, residing at Crowther, in the county of McMullen and State of Texas, have invented new and useful Improvements in Foot-Scrapers for Vehicles, of which the following is a specification.

This invention pertains to certain new and useful improvements in foot scrapers for vehicles, and the object of the invention is to provide an improved, simplified and economical device of this type which can be readily and quickly fastened to the axle or other suitable part of a vehicle, in such position that a person about to enter the vehicle can conveniently use the scraper.

Figure 1:
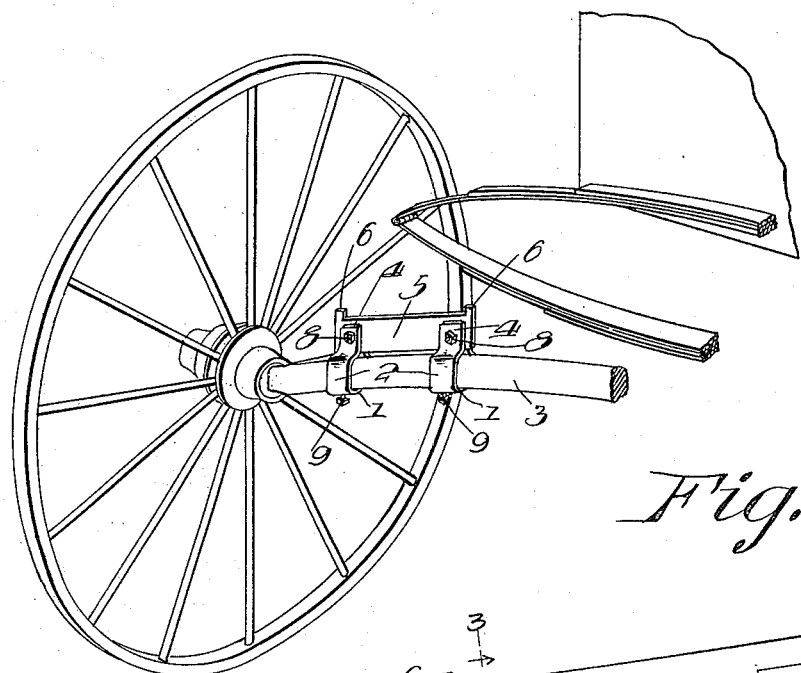
Figure 2:
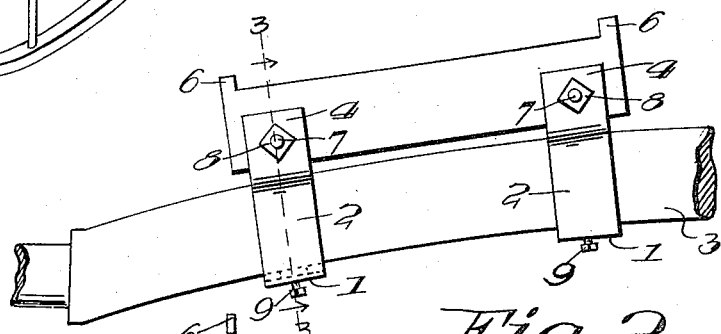
Figure 3:
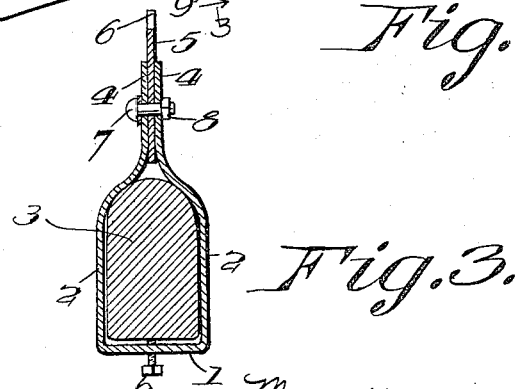

In the drawings, Figure 1 is a fragmentary perspective view of a buggy, showing the invention applied to the front axle thereof; Fig. 2 is a fragmentary front elevation of the axle with the scraper in position thereon; and Fig. 3, is a section on the line 3—3 of Fig. 2.

The present invention consists of a pair of clamps each formed of a strip of metal folded to have a bottom 1, sides 2, that engage on opposite sides of the axle 3, said sides terminating at their upper ends in upwardly and inwardly inclined shoulders 3', which in turn terminate in a pair of spaced arms 4. The clamps are arranged in spaced relation and receive between the arms 4 thereof the scraper blade 5, which latter is formed with abutments 6 at its ends, which abutments are shown as being in the form of upwardly extending ears that prevent the foot of the user from sliding or slipping off of the ends of the blade, when in use. The blade and each of the arms 4, is formed with registering openings for the purpose of receiving bolts 7 that pass therethrough, the bolts having nuts 8 on their threaded ends, which when tightened on the bolts rigidly connect the parts in an obvious manner. The bottom 1 of each clamp is formed with a screw-threaded aperture for the purpose of receiving screws 9 that abut the bottom side or face of the axle to hold the clamps securely thereon.

From the above description it will be obvious that scraper blades of various lengths or sizes can be readily substituted, and to remove the entire device, it is merely necessary to remove the nuts and bolts, whereupon the blade can be raised up out of its position between the arms 4, and the latter can then be spread to allow them to pass down past the sides of the axle. The bolts, when tightened, serve to hold the clamps to the axle making it possible to dispense with the screws 9, in some cases where desired.

What is claimed is:

A foot scraper for vehicles, composed of a pair of spaced clamps, each clamp consisting of a strip of metal bent central of its length to provide a bottom that engages the under face of the vehicle axle, sides adapted to slidably engage on opposite sides of the axle, said sides terminating at their upper ends in inwardly and upwardly inclined shoulders, arms extending upwardly from the shoulders in spaced relation to each other, a scraper blade extending across the space between the clamps and having its ends secured between the free ends of the arms in the space between the latter, the lower edge of the scraper being spaced from the upper face of the axle, means to removably secure said blade to said arms, and set screws projected through the bottoms of the clamps and having their upper ends abutting the under face of the vehicle axle whereby the clamps may be moved downwardly with respect to the axle so as to draw said shoulders in yielding engagement with the upper face of the axle.

In testimony whereof I have hereunto set my hand in presence of two subscribing witnesses.

MAUD VAN METER BROWN.

Witnesses:
RUSSELL BURMEISTER,
SALLIE BURMEISTER.

Copies of this patent may be obtained for five cents each, by addressing the "Commissioner of Patents, Washington, D. C."